Patented Nov. 6, 1951

2,573,947

UNITED STATES PATENT OFFICE 2,573,947

PREPARATION OF HYDROPEROXIDE COMPOUNDS

Edward R. Bell, Berkeley, Frederick F. Rust, Oakland, and William E. Vaughan, Berkeley, Calif., assignors to Shell Development Company, San Francisco, Calif., a corporation of Delaware No Drawing. Application July 1, 1949,
Serial No. 102,718

15 Claims. (Cl. 260—610)

This invention relates to the preparation of peroxidic compounds, and it more particularly relates to a process for the preparation of organic hydroperoxidic compounds having directly linked to the hydroperoxy radical an alkyl group, especially an alkyl group which contains a tertiary carbon atom and is linked to the hydroperoxy radical by a bond of a tertiary carbon atom. In a specific aspect, the present invention relates to a new and improved process for the preparation of tertiary-butyl hydroperoxide.

It is known to produce certain alkyl hydroperoxides by reacting a pure neutral dialkyl sulfate with hydrogen peroxide in the presence of an alkali. The difficulty and expense of preparing pure neutral dialkyl sulfates, as well as the toxicity of these reagents, have been undesirable features of the known processes of this character. Furthermore, since the alkyl hydroperoxides have been obtained thereby only in undesirably low yields and in a crude form which is difficult to purify, these known processes have had little, if any, practical application to the preparation of pure alkyl hydroperoxides.

It also is known that certain alkyl hydroperoxides can be prepared by alkylation of hydrogen peroxide in aqueous solution by treatment with a suitable alkyl hydrogen sulfate or by treatment of an anhydrous solution of hydrogen peroxide in an alcohol with a solid dehydrating agent, such as anhydrous sodium sulfate. These methods and certain specific applications thereof are as described by Milas and his associates in the following patents and articles: U. S. Patents Nos. 2,176,407 and 2,223,807 to Milas, and Journal of the American Chemical Society, volume 60, pages 2434 to 2436 (1938) and volume 68, pages 205 to 208, 643 to 644, and 1938 to 1940 (1946).

The thus known method for alkylation of hydrogen peroxide by treatment of an anhydrous alcoholic solution of hydrogen peroxide with a solid dehydrating agent involves the use of unduly large amounts of the reactants relative to the amount of the hydroperoxide product and further requires the step of salting-out or dehydrating the mixture of reactants by treatment with large amounts of a solid dehydrating agent. Both of these features detract from the utility of the process for large-scale operations because of the expense or the necessity for specialized equipment which they introduce, and for this reason, among others, the method has found no technical application of which we are aware.

The alkylation of hydrogen peroxide by treatment in aqueous solution with an alkyl hydrogen sulfate, also described by Milas in the above-acknowledged prior art, likewise has not been entirely satisfactory for the production on a large scale of pure tertiary or other alkyl hydroperoxides. The method as described by Milas results in an undesirably low efficiency, compared to that theoretically possible, in the conversion of the expensive hydrogen peroxide reactant to the desired organic hydroperoxide product and/or in excessive formation of other products which may be, depending upon the particular conditions employed, polymers of the olefin derived from the alkyl hydrogen sulfate reactant, peroxidic products other than the desired alkyl hydroperoxide, products of decomposition of the alkyl hydroperoxide, or the like. Again because of the instability of the desired organic hydroperoxide products, their purification from the complex products of this known process has been accomplished heretofore only by procedures that have little or no utility in an economic process for large-scale manufacture. On the other hand, many of the uses of the desired hydroperoxide products demand that the products be in a pure or substantially pure state and, further, that the cost of the products be maintained within reasonable limits. Insofar as we are aware, it has not been found possible in economic large-scale operations to meet these requirements by means of the heretofore known prior art processes for the preparation of alkyl hydroperoxides, particularly those of the tertiary-alkyl variety.

Considering the foregoing and related matters, a principal object of the present invention is a new and improved process for the preparation of hydroperoxidic compounds, particularly alkyl hydroperoxide compounds of the tertiary-alkyl variety. Another important object of the invention is a process for the alkylation of hydrogen peroxide in aqueous solution, resulting in increased, substantially quantitative selectivity in the formation of desired hydroperoxide product and in substantially complete preclusion of the formation of other possible products. Such a process wherein there is realized increased efficiency in the conversion of the hydrogen peroxide reagent to desired hydroperoxide product is another object of the invention. A specific object of the invention is an improved process for the preparation of pure lower tertiary-alkyl hydroperoxides, particularly pure tertiary-butyl hydroperoxide. Other objects of the invention will become apparent from the nature of the disclosures and claims hereinafter.

It now has been discovered in accordance with the present invention that, in the alkylation of hydrogen peroxide in a concentrated aqueous solution by treatment in the presence of an acid catalyst with an alkylating agent therefor, such as an alkyl hydrogen sulfate or the corresponding alcohol, material advantages, particularly improved selectivity in the formation of desired hydroperoxide product, reduced formation of by-products and increased efficiency in conversion of the hydrogen peroxide to desired product, are realized by conducting the alkylation in the presence of a water-immiscible inert organic solvent preferably having a boiling point below that of the desired hydroperoxide product, and being present in an amount sufficient to form a separate, organic-solvent phase in intimate contact with the aqueous reaction liquid. The process of the present invention conveniently may be carried out by mixing in liquid state the alkylating agent, which may be the alcohol corresponding to the desired hydroperoxide product or a suitable alkyl hydrogen sulfate or solution thereof, prepared, for example, from the suitable alcohol or olefin and sulfuric acid, with an aqueous solution of hydrogen peroxide having a concentration of about 50% $H_2O_2$ by weight, and an excess of a water-immiscible inert organic solvent, and conducting the reaction between the water-soluble alkylating agent and the aqueous solution of hydrogen peroxide in liquid phase in the presence of an acidic catalyst at a temperature desirably within the range of from about 40° C. to about 70° C. After reaction has occurred, the organic-solvent phase, which contains substantially pure alkyl hydroperoxide product dissolved therein, is separated from the aqueous liquor. The organic-solvent solution of the alkyl hydroperoxide is in itself a useful product. On the other hand, if the alkyl hydroperoxide is desired in pure state the organic solvent, which in this case desirably is one having a boiling point below the boiling point of the alkyl hydroperoxide product, may be removed from the solution simply by evaporation in vacuo or other applicable methods to isolate in pure state the alkyl hydroperoxide product.

The improvement which forms the subject matter of the present invention may be applied generally to the preparation of hydroperoxidic compounds of the alkyl hydroperoxide variety, especially those wherein a tertiary-alkyl radical is directly linked to the hydroperoxy (—O—O—H) radical, by the alkylation of hydrogen peroxide in an acidic aqueous medium by treatment with a water-soluble alkylating agent therefor. As a class, the hydroperoxidic compounds which may be prepared according to the improved process of the invention are characterized by the structural formula R—O—O—H in which R represents an alkyl radical, which may or may not be substituted and which may be of the straight-chain or of the branched-chain variety. Particularly valuable hydro-peroxidic products, to the preparation of which the process of the invention is especially suited, are the hydroperoxidic products of the tertiary-alkyl variety, that is, the alkyl hydroperoxides in which the alkyl radical R contains a tertiary carbon atom and is directly linked to the oxygen atom of the hydroperoxy radical by a bond of a tertiary carbon atom, such alkyl radical preferably being an unsubstituted tertiary alkyl radical. Illustrative tertiary alkyl hydroperoxides which may be prepared in an improved manner in accordance with the process of the invention include, among others, tertiary-butyl hydroperoxide, tertiary-amyl hydroperoxide, 2-isopropylisopropyl hydroperoxide, 2-propylisopropyl hydroperoxide, 2-t-butylisopropyl hydroperoxide, as well as the tertiary-alkyl hydroperoxides formed by the substitution of the hydroperoxy (—O—O—H) radical for a hydrogen atom on one or more of the tertiary carbon atoms of such saturated aliphatic hydrocarbons as 2-ethylbutane, 2-ethylpentane, 3-ethylpentane, 2,4-dimethylpentane, and their homologs and analogs. Other, less preferred hydroperoxidic products to the prepartion of which the principles of the invention may be advantageously applied are primary and secondary alkyl hydroperoxides, such as ethyl hydroperoxide, isopropyl hydroperoxide, butyl hydroperoxide, and amyl hydroperoxide, cycloaliphatic hydroperoxides such as cyclohexyl hydroperoxide, and the various homologs and analogs thereof. Especially preferred compounds which are prepared by the process of the invention are the unsubstituted tertiary alkyl hydroperoxides which contain from four to six carbon atoms in the alkyl radical.

It was stated above that the process of the invention involves the alkylation in an aqueous medium of hydrogen peroxide by treatment in the presence of an acidic catalyst with a water-soluble alkylating agent therefor. The alkylating agent preferably may be the alcohol corresponding to the hydroperoxide product which it is desired to prepare. In other cases, the alkylating agent may be, for example, the alkyl hydrogen sulfate or other mono-alkyl salt of an inorganic acid corresponding to the hydroperoxide product it is desired to prepare. Such mono-alkyl salts of inorganic acids may be prepared according to known methods by suitably reacting the corresponding alcohol with the inorganic acid, e. g., concentrated sulfuric acid, or they may be prepared also according to known methods from a suitable olefin and the inorganic acid. In general, water-insoluble alkylating agents are not suited to the process of the invention. That is to say, the advantages of the invention are peculiar to processes conducted in the presence of an aqueous medium and wherein the alkylating agent has an appreciable solubility in acidic aqueous solutions of hydrogen peroxide, and preferably is completely miscible with such acidic aqueous solutions.

As the acidic catalyst there preferably is employed a strong acid, such as orthophosphoric acid, sulfuric acid, hydrochloric acid, metaphosphoric acid, pyrophosphoric acid, selenic acid, tungstic acid, or the like. Strong non-volatile mineral acids are especially preferred as the acidic catalyst. Of the mineral acids, as disclosed in our copending application Serial No. 102,717, filed July 1, 1949, the heteropoly acids, such as silicotungstic acid, phosphomolybdic acid, phosphotungstic acid, and the like, are of particular interest because of the very small amounts that need be employed. On the other hand, in certain cases, it is especially suitable for reasons of cost to employ sulfuric acid as the acidic catalyst. Instead of a strong mineral acid there may be employed a strong organic acid, such as oxalic acid, chloroacetic acid, dichloroacetic acid, trichloroacetic acid, etc., as well as suitable strong organic acids containing an inorganic acidic radical, such as the sulfo radical, as in the aryl sulfonic acids, the alkyl sulfonic acids, or the like. Illustrative of the latter types of strong acids are p-toluenesulfonic acid, benzenesulfonic acid, 1,3,5-trimethylbenzenemonosulfonic acid, the xylenesulfonic acids, fluorobenzene-4-sulfonic acid, o-dichlorobenzene-4-sulfonic acid, nitrobenzene-3-sulfonic acid, amylsulfonic acid, etc. Other acidic catalysts which may be employed are the halide-type Friedel-Crafts catalysts, including boron trichloride, boron trifluoride, as well as halides of amphoteric polyvalent metals, such as chlorides of aluminum, iron, antimony, tin, titanium, and the like. In general, strong non-reducing mineral oxyacids, which preferably contain the characterizing element (e. g., P, S, Se, W, etc.) at its highest valency or oxidation level have the particular advantages of availability at low cost, high effectiveness as catalysts for the alkylation reaction, and properties (e. g., solubility, acidic strength, etc.) which adapt them to efficient utilization in the process of this invention.

While various inert water-immiscible organic solvents may be employed in the execution of the process according to the invention, it has been discovered that lower halogen-substituted hydrocarbons, especially chlorine-substituted lower paraffins, are of outstanding value and suitability to the objects of the invention. Suitable haloparaffins include methyl chloride, methylene chloride, chloroform, carbon tetrachloride, trichloroethane, ethylidene chloride, ethyl chloride, isopropyl chloride, butyl bromide, 1,2,3-trichloropentane amyl bromide, n-hexyl bromide, n-hexyl chloride, pentamethylene dichloride, 1,3,5-trichlorohexane, and the like, and their various homologs and analogs. Unsaturated halogen-substituted hydrocarbons which may be employed are exemplified by trichloroethylene, s-dichloroethylene, 1-chloropropene, 1,4-dichlorobutene-1, 1,4-dibromobutene-1, and the like. Halogen-substituted aliphatic hydrocarbons containing up to eight or more carbon atoms may be employed. Outstandingly effective for obtaining high yields of pure alkyl hydroperoxides according to the invention are the chloromethanes, chloroform and methylene chloride being especially preferred. Somewhat less effective are various hydrocarbon solvents, although in certain cases, as for reasons of cost, they may be employed with adequately satisfactory results. Among the various hydrocarbon solvents, the aromatic hydrocarbon solvents, such as benzene, toluene, xylene, and the like, are particularly efficacious. Aliphatic hydrocarbon solvents, e. g., a heptane, an octane, a nonane or a decane, may be used, although they are less effective than the aromatic hydrocarbon solvents. Nitro-substituted hydrocarbons, preferably of the paraffin type, such as nitromethane, 1-nitropropane, 2-nitropropane, the nitrobutanes, and the nitropentanes, also represent suitable inert solvents which may be employed.

If it is desired ultimately to obtain the alkyl hydroperoxide product in the pure state, i. e., free of solvents or other diluents, the organic solvent which is employed preferably boils at a temperature below that of the alkyl hydroperoxide. This is because of the rigid exclusion (for reasons of safety) of fractional distillation of the alkyl hydroperoxide product as a generally applicable method for the plant-scale purification of alkyl hydroperoxides such as those produced by the present process. When a suitable low-boiling organic solvent, such as chloroform or methylene chloride, is employed, it may be removed from the separated organic-solvent phase simply by evaporation, preferably in vacuo, without need for vaporization of the alkyl hydroperoxide. The alkyl hydroperoxide, which remains as the residue of such evaporation, ordinarily has, because of the beneficial effects obtained by conducting the alkylation in the presence of the inert solvent as described herein, a purity such as to meet the most rigid of requirements for its practical application.

In the execution of the process of the invention, an aqueous solution of hydrogen peroxide, which conveniently may have a concentration of from about 30% to 50% or more by weight, the alkylating agent, the acidic catalyst, and the water-immiscible inert organic solvent are mixed in suitable proportions, preferably with agitation, and the reaction between the alkylating agent and the hydrogen peroxide conducted in the heterogeneous mixture while the temperature is maintained within reasonable limits. An amount of the inert organic solvent sufficient to form a separate organic-solvent phase is provided. Subject to this limitation, a reasonable latitude in the amount of the organic solvent is permissible. Desirably, the volume of the organic-solvent phase is equal to not less than about one-quarter the volume of the aqueous phase. The objects of the invention are most effectively attained when the volume of the organic-solvent phase is not less than about one-half that of the aqueous phase. There is no known theoretical upper limit to the amount of the organic solvent that can be employed, provided the two phases are present, although for obvious practical reasons the amount of the organic solvent will be kept within reason. Ordinarily the organic solvent phase in contact with the aqueous phase need not exceed about 25 times the volume thereof, and preferably it is not over about 5 times the volume of the aqueous phase.

It is to be appreciated that, in the synthesis of alkyl hydroperoxides by alkylation of hydrogen peroxide, potential by-products are dialkyl peroxides, polymers of the olefin or olefins which is or are related to the alcohol or other alkylating agent, or the like, depending upon the particular reaction conditions employed. At least in the case of the tertiary-alkyl hydroperoxides, particularly those wherein the alkyl group contains from four to six carbon atoms, these by-products are less polar and have a substantially lower solubility in water than do the desired alkyl hydroperoxide products. Although the present invention is not predicated upon any theory of operation, it is believed that, at least in part, the function of the inert organic solvent is to extract from the aqueous reaction mixture the alkyl hydroperoxide product substantially as rapidly as it is formed therein, thereby removing it from the sphere of reaction. It will be noted that the process of the present invention results in formation and concentration in the non-aqueous phase of the most polar or most water-soluble of these possible products, rather than the least polar or least water-soluble, as reasonably could be expected.

The conditions under which the process is executed may in general be any of those conditions heretofore known to be suitable for the alkylation of hydrogen peroxide in aqueous acidic solution to produce, among other products, alkyl hydroperoxides. In each case, by conducting the reaction as herein disclosed in the presence of a separate water-immiscible phase comprising essentially an inert water-immiscible organic solvent of the character hereinbefore outlined, a purer hydroperoxide product is obtained in higher yield and with more efficient conversion of hydrogen peroxide to desired product than is obtained in the known process.

In conducting the process according to the invention, the relative proportion of the hydrogen peroxide and the alkylating agent therefor, e. g., the selected alcohol, the alkyl hydrogen sulfate or alkyl salt of other inorganic acid, is subject to reasonable variation. Generally speaking, there is employed at least about 0.5 mole of hydrogen peroxide per mole of the alkylating agent, and the hydrogen peroxide preferably may be employed in an amount at least molecularly equivalent to the alkylating agent. The use of unduly large excesses of hydrogen peroxide tends to be uneconomic, although conducting the reaction in the presence of a moderate excess of hydrogen peroxide frequently is advantageous from the standpoint of efficiency and selectivity in the production of the desired alkyl hydroperoxide product. Because of the substantial absence of side reactions during the execution of the process in accordance with the invention, excess hydrogen peroxide added to the reaction mixture remains substantially unreacted and may be recycled or reutilized. It is advantageous to employ an amount of hydrogen peroxide from about the calculated amount required for the reaction up to about 250% of the calculated amount. Mole ratios of alkylating agent to $H_2O_2$ from about 1:0.5 to about 1:2 are particularly preferred.

The amount of the acid catalyst may be varied according to the nature of the particular reactants that are employed, the identity of the acidic catalyst, and the reaction conditions under which the process is to be executed. As a general rule, the amount of the acidic catalyst may be varied from as little as 0.005 mole to as much as 5 moles of the acid per mole of the alkylating agent, a preferred general range being from about 0.2 to about 2 moles of acid catalyst per mole of the alkylating agent.

The reaction temperature that is employed may be as high as 90° C. Maximum temperatures of about 70° C. are preferred. Minimum temperatures as low as —10° C. or below are suitable, depending upon the freezing temperatures of the reaction mixtures. When the reaction temperature is within the preferred range of from about 40° C. to about 70° C., there is obtained the singular advantage that reaction times as short as 5 minutes often are adequate and reaction times of from as little as 10 to no more than 30 minutes generally afford substantial formation of the desired hydroperoxide product. Longer reaction times appear to do no particular harm. In general, the reaction time may be varied as the particular reactants, the particular catalyst, and other conditions of the process warrant.

The process conveniently may be carried out under atmospheric pressures. However, moderately superatmospheric pressures or subatmospheric pressures may be used.

The process of the invention may be conducted in a batchwise, an intermittent or a continuous manner. The process is particularly suited to continuous operation. In batchwise operations, the hydrogen peroxide, which conveniently may be furnished in the form of an aqueous solution having an $H_2O_2$ content of from about 30% to about 50% or more by weight, the alkylating agent, which, for example in the case of alkyl salts of inorganic acids, such as alkyl hydrogen sulfate, may have been previously prepared as by reaction of the suitable alcohol or olefin and inorganic acid or may be formed in situ as by reaction of the suitable alcohol or olefin and inorganic acid, the catalyst, and the inert water-immiscible organic solvent may be mixed in suitable proportions, preferably with agitation, and the reaction allowed to proceed while keeping the temperature within suitable limits. The reacting mixture desirably is agitated to afford intimate and thorough contact between the immiscible phases thereof.

In continuous operation, separate streams comprising, for example, the aqueous solution of hydrogen peroxide, the alkylating agent (or materials from which it is formed if to be formed in situ), the acidic catalyst, and the inert organic solvent may be combined and passed, desirably in turbulent flow, through a reaction zone, such as an elongated reaction tube or pipe surrounded by a fluid heat-control bath maintained at the desired temperature, the rate of flow of the reaction mixture and the dimensions of the reaction zone being so correlated that the desired reaction or residence time is obtained. At least the surfaces of the equipment which are in contact with the reaction mixture should be constructed of some suitable corrosion-resistant material, such as glass, porcelain, stainless steel, tantalum, etc.

According to another aspect of the invention, the process may be conducted continuously by combining streams of the aqueous hydrogen peroxide solution, the acidic catalyst and the alkylating agent and passing the aqueous mixture in countercurrent flow to a stream of the inert water-immiscible organic solvent in intimate contact therewith, while maintaining suitable reaction conditions, and separating the aqueous phase and the organic-solvent phase, and recovering desired alkyl hydroperoxide product from the separated organic solvent phase. The contacting of the organic solvent phase and the aqueous phase may be effected in one or in a plurality of liquid-liquid contact zones.

After reaction has occurred, the aqueous and the organic-solvent phase of the reaction mixture are separated by known methods (such as settling, centrifugation, decantation or the like). Any traces of the acid catalyst which may be dissolved in the organic-solvent phase may be neutralized, if desirable, by addition of the calculated amount of a suitable base, or alkali, and the salt thus formed removed, for example, by filtration. The organic solvent, which in a preferred aspect of the invention is one which boils at temperatures below the boiling point of the alkyl hydroperoxide product, is stripped or distilled from the organic-solvent phase, preferably under reduced or subatmospheric pressure. The solvent thus removed may be re-utilized, i. e., recycled in continuous operations. The aqueous portion of the reactor effluent, which contains the acid catalyst, any unreacted hydrogen peroxide, etc., may be treated according to known methods and recycled or re-utilized. Because of the substantial absence of by-products in the aqueous portion of the reactor effluent, it ordinarily may be treated, as by evaporation or distillation, to remove undesired water, and directly re-utilized or recycled through the process with addition of further amounts of acid catalyst and/or hydrogen peroxide as required. By virtue of the high yields of desired hydroperoxide product based upon the amount of the hydrogen peroxide consumed in all reactions, very high efficiencies, approaching theoretical, in conversion of hydrogen peroxide applied to the desired product, may be attained.

The following examples are presented as being illustrative of the invention and without intent that they shall be construed as limiting the invention as it is more broadly disclosed and claimed herein.

Example I

In a glass-lined reaction vessel equipped with a water-cooled reflux condenser and an efficient mechanical stirrer, tertiary-butyl alcohol and an aqueous 50% by weight solution of hydrogen peroxide are mixed in proportions corresponding to a molar ratio of t-$C_4H_9OH:H_2O_2$ of 1:1. To the resulting mixture there are added 1.3 volumes of chloroform per volume of the mixture. While the mixture is vigorously agitated, there is added an amount of aqueous 70% solution of sulfuric acid in an amount corresponding to 0.5 mole of $H_2SO_4$ per mole of tertiary-butyl alcohol. The mixture is maintained with agitation at about 60° C. for twenty minutes, then cooled rapidly, and the two phases separated by decantation. The water-immiscible or chloroform phase is evaporated in vacuo to remove the chloroform, leaving in the vessel the tertiary-butyl hydroperoxide product.

The tertiary-butyl hydroperoxide product thus prepared has by analysis a purity of 97% based upon all reaction products present. The amount of tertiary-butyl hydroperoxide thus obtained represents an 86% conversion of the hydrogen peroxide reactant to tertiary-butyl hydroperoxide.

Both the purity of the tertiary-butyl hydroperoxide, which, it will be noted, is prepared in this experiment without subsequent purification, and the conversion of hydrogen peroxide to tertiary-butyl hydroperoxide, are significantly higher than the purity of the product and the conversion of hydrogen peroxide to tertiary-butyl hydroperoxide reported by Milas and Surgenor, Journal of the American Chemical Society, volume 68, page 206 (1946), who obtained by the process there disclosed tertiary-butyl hydroperoxide products containing a minimum of 24.5% ditertiary-butyl peroxide and who reported maximum conversion of hydrogen peroxide to tertiary-butyl hydroperoxide no greater than 58%.

Example II

As a further illustration of the invention, there are mixed in the reaction vessel used in the preceding example tertiary-butyl alcohol and a 50% solution of hydrogen peroxide in water in amounts corresponding to a mole ratio t-$C_4H_9OH:H_2O_2$ equal to 1.1:1.0. To the mixture there are added about 1.3 volumes of methylene chloride and then 70% aqueous sulfuric acid in an amount corresponding to about 0.45 mole of $H_2SO_4$ per mole of tertiary-butyl alcohol. The mixture is maintained with agitation at about 40° C. for fifteen minutes, then cooled rapidly and the two phases separated by decantation. The tertiary-butyl hydroperoxide product is recovered by evaporation of the methylene chloride from the separated organic-solvent phase.

In this experiment, the only detected product is the tertiary-butyl hydroperoxide. That is to say, within the limits of the tests employed a quantitative yield of tertiary-butyl hydroperoxide, based upon the amount of hydrogen peroxide consumed, is obtained. In terms of hydrogen peroxide applied, the conversion of hydrogen peroxide to tertiary-butyl hydroperoxide is 74%.

The results of this experiment are definitely superior to those reported by Milas in U. S. Patent 2,223,807, wherein the maximum disclosed percentage of tertiary-butyl hydroperoxide is 44.3% and the reported yield of tertiary-butyl hydroperoxide, based on the amount of hydrogen peroxide used, is 27.1%.

Example III

In order to show further the advantageous effects of conducting the alkylation of alcohols, such as tertiary-butyl alcohols, in the presence of a separate phase consisting essentially of an inert water-immiscible organic solvent, the experiment carried out in the foregoing example is repeated using tertiary-butyl alcohol and hydrogen peroxide (50% aqueous solution) in a mole ratio of t-$C_4H_9OH:H_2O_2$ equal to 1.2:1 and 0.625 mole of sulfuric acid (70%) per mole of the tertiary-butyl alcohol. Despite the use of a higher concentration of sulfuric acid than in the preceding experiment, the tertiary-butyl hydroperoxide product is obtained in a yield of about 98% in terms of all reaction products, and is obtained in a conversion of hydrogen peroxide applied to recovered tertiary-butyl hydroperoxide equal to 85.2%.

Example IV

In accordance with the method illustrated in the preceding examples, tertiary-butyl alcohol, a 50% solution of hydrogen peroxide in water, and 70% aqueous sulfuric acid are mixed in a molar ratio t-$C_4H_9OH:H_2O_2:H_2SO_4$ equal to 1.2:1.0:1.0 and reacted at 30° C. for 15 minutes, in the presence of about 1.3 volumes of iso-octane. The tertiary-butyl hydroperoxide product, recovered and analyzed in the same manner illustrated above, was obtained in a yield corresponding to 81% based on all products and in a conversion of hydrogen peroxide to tertiary-butyl hydroperoxide equal to 69%.

The results thus obtained likewise are definitely superior to those disclosed in the article by Milas and Surgenor. The especial advantages in the purity of the product which are realized by employing a halogenated paraffin, such as a chloromethane, are illustrated by a comparison of this experiment with those described in the preceding examples.

Example V

This example consists of two experiments, one conducted in the absence of an inert organic solvent and the second carried out under the same conditions in the presence of an organic solvent. In the first experiment, the reaction between tertiary-amyl alcohol and hydrogen peroxide is effected by mixing tertiary-amyl alcohol, a 50% solution of hydrogen peroxide in water, and 70% aqueous sulfuric acid in amounts corresponding to a mole ratio t-$C_5H_{11}OH:H_2O_2:H_2SO_4$ equal to 1.0:0.97:0.3, and maintaining the mixture with agitation at 50° C. for one hour. At the end of the hour, the mixture is cooled to room temperature, the supernatant organic phase separated by decantation and analyzed. The tertiary-amyl hydroperoxide is obtained in a conversion of applied hydrogen peroxide to product equal to 68% and in a yield of 92.4% based upon all reaction products present. Traces of sulfuric acid and hydrogen peroxide remaining in the organic phase, if objectionable, may be removed by washing with an aqueous suspension of calcium carbonate, then with water alone, and drying.

In the second experiment, the procedure and conditions are the same except that there is added to the reaction mixture at the start of the reaction time an equal volume of benzene. After completion of the reaction the benzene layer is removed by decantation and analyzed. The conversion to product of $H_2O_2$ applied is found to be 67%. The tertiary-amyl hydroperoxide is found to be the only product present, both in the benzene layer and in the aqueous phase. In other words, by conducting the reaction in the presence of benzene according to the process of the invention, a quantitative yield of tertiary-amyl hydroperoxide was obtained. As far as we are aware, this represents the first time that this result has been achieved in the synthesis of tertiary-alkyl hydroperoxides by the alkylation of hydrogen peroxide in the presence of an acidic catalyst.

The result thus obtained will be seen to be notably superior to the results disclosed by Milas and Surgenor in Journal of the American Chemical Society, volume 68, page 643 (1946), wherein the tertiary-amyl hydroperoxide is stated to be obtained in a purity of only 55.6%. The conversion of hydrogen peroxide to tertiary-amyl hydroperoxide likewise is superior to the conversion obtained by Milas and Surgenor, since they reported obtaining 715 grams of product which was 55.6% pure. This represents 398 grams of tertiary-amyl hydroperoxide from 10 moles of hydrogen peroxide applied, or in other words, a conversion to desired product of hydrogen peroxide applied equal to only 38.3%.

Although the process of the invention has been specifically exemplified by the preparation of tertiary-butyl hydroperoxide and tertiary-amyl hydroperoxide, other alkyl and cycloalkyl hydroperoxides, especially those in which a hydroperoxy radical is directly linked to a tertiary carbon atom, may be prepared with similar advantages. In the foregoing examples there can be substituted for the tertiary-butyl alcohol and tertiary-amyl alcohol other alcohols, such as tertiary alcohols represented by the tertiary hexanols, the tertiary heptanols, 1-methylcyclohexanol, and like aliphatic and cycloaliphatic, preferably saturated alcohols, as well as even primary and secondary alcohols, such as ethanol, isopropanol, isobutanol, methylisobutylcarbinol, cyclohexanol, and the like, with corresponding advantages over the process conducted in the absence of the added organic solvent. The tertiary-alkyl hydroperoxide products in particular, which can be prepared by the present invention, are useful for a variety of purposes, for example, as germicides, as catalysts for the polymerization of polymerizable olefinic compounds, and as intermediates for the synthesis according to the disclosures of United States Patent No. 2,455,569, to Dickey, of the valuable peroxidic compounds therein disclosed, which products are useful as catalysts for the polymerization of polymerizable olefinic compounds and as additives to improve the cetane value of diesel engine fuels.

We claim as our invention:

1. In a process for the production of tertiary-butyl hydroperoxide by treatment of hydrogen peroxide in aqueous solution with tertiary-butyl alcohol in the presence of sulfuric acid, the improvement which comprises intimately contacting the aqueous reacting mixture with a discrete organic-solvent liquid phase essentially comprising chloroform and recovering tertiary-butyl hydroperoxide from the organic-solvent liquid phase.

2. In a process for the production of tertiary-butyl hydroperoxide by treatment of hydrogen peroxide in aqueous solution with tertiary-butyl alcohol in the presence of sulfuric acid, the improvement which comprises intimately contacting the aqueous reacting mixture with a discrete organic-solvent liquid phase essentially comprising methylene chloride and recovering tertiary-butyl hydroperoxide from the organic-solvent liquid phase.

3. In a process for the production of tertiary-amyl hydroperoxide by treatment of hydrogen peroxide in aqueous solution with tertiary-amyl alcohol in the presence of sulfuric acid, the improvement which comprises intimately contacting the aqueous reacting mixture with a discrete organic-solvent liquid phase essentially comprising benzene and recovering tertiary-amyl hydroperoxide from the organic-solvent liquid phase.

4. In a process for the preparation of tertiary-butyl hydroperoxide by alkylation of hydrogen peroxide in aqueous solution by treatment with an alkylating agent therefor in the presence of a strong acid, the improvement which comprises intimately contacting the aqueous reacting mixture with a discrete organic-solvent liquid phase essentially comprising a halogen-substituted methane and recovering tertiary-butyl hydroperoxide from the organic-solvent liquid phase.

5. A process for the preparation of a tertiary-alkyl hydroperoxide containing from four to six carbon atoms in the alkyl group, which process comprises mixing a tertiary alcohol containing from four to six carbon atoms, sulfuric acid, an aqueous solution of hydrogen peroxide, and a halogen-substituted methane, conducting the reaction in the resulting liquid mixture comprising an aqueous phase and an organic-solvent phase essentially comprising the halogen-substituted methane, whereby tertiary-alkyl hydroperoxide passes substantially as rapidly as formed from the aqueous phase into said organic-solvent phase, and separating said organic-solvent phase containing substantially pure tertiary-alkyl hydroperoxide from the aqueous phase.

6. In a process for the preparation of an alkyl hydroperoxide by the alkylation of hydrogen peroxide in aqueous solution by treatment with an alkylating agent therefor in the presence of a strong acid catalyst, the improvement which comprises extracting substantially pure alkyl hydroperoxide product from the aqueous reaction mixture substantially as rapidly as it is formed therein by intimately contacting the aqueous reaction mixture with a liquid lower halogen-substituted aliphatic hydrocarbon.

7. In a process for the preparation of tertiary-butyl hydroperoxide by the alkylation of hydrogen peroxide in aqueous solution by treatment with an alkylating agent therefor in the presence of an acidic catalyst, the improvement which comprises extracting substantially pure tertiary-butyl hydroperoxide from the aqueous reaction mixture substantially as rapidly as it is formed therein by intimately contacting the aqueous reaction mixture with a chlorine-substituted methane.

8. A process for the preparation of an alkyl hydroperoxide characterized by high yield and purity of product and by high conversion of reactants to the hydroperoxide product, which process comprises reacting hydrogen peroxide and an alkylating agent therefor in an aqueous solution in the presence of an acidic catalyst, extracting from the aqueous solution alkyl hydroperoxide product substantially as rapidly as formed therein by intimately contacting said aqueous solution with an inert water-immiscible organic solvent for the alkyl hydroperoxide product, said organic solvent being one boiling at a temperature below the boiling temperature of the alkyl hydroperoxide product, separating the solution of the alkyl hydroperoxide product in the inert organic solvent from the aqueous solution, and volatilizing the organic solvent from the separated solution to recover substantially pure alkyl hydroperoxide product.

9. A process for the preparation of an alkyl hydroperoxide characterized by high yield and purity of product and by high conversion of reactants to the hydroperoxide product, which process comprises reacting hydrogen peroxide and an alkylating agent therefor in an aqueous solution in the presence of an acidic catalyst, and extracting from the aqueous solution alkyl hydroperoxide product substantially as rapidly as formed therein by intimately contacting said aqueous solution with an inert water-immiscible organic solvent for the alkyl hydroperoxide product.

10. A process for the production of tertiary-butyl hydroperoxide, which process comprises mixing tertiary-butyl alcohol and a substantially equimolar amount of hydrogen peroxide in the form of an aqueous solution of hydrogen peroxide, reacting said tertiary-butyl alcohol with said hydrogen peroxide in the resulting aqueous mixture in the presence of added sulfuric acid while maintaining the aqueous reaction mixture in intimate contact with a sufficient amount of added chloroform to provide a liquid organic-solvent phase immiscible with the aqueous reaction mixture, whereby tertiary-butyl hydroperoxide is extracted substantially as rapidy as it is formed from the aqueous reaction mixture into the water-immiscible organic-solvent phase, and recovering tertiary-butyl hydroperoxide from said organic phase.

11. A process for the production of tertiary-butyl hydroperoxide, which process comprises mixing tertiary-butyl alcohol and a substantially equimolar amount of hydrogen peroxide in the form of an aqueous solution of hydrogen peroxide, reacting said tertiary-butyl alcohol with said hydrogen peroxide in the resulting aqueous mixture in the presence of added sulfuric acid while maintaining the aqueous reaction mixture in intimate contact with a sufficient amount of added methylene chloride to provide a liquid organic-solvent phase immiscible with the aqueous reaction mixture, whereby tertiary-butyl hydroperoxide is extracted substantially as rapidly as it is formed from the aqueous reaction mixture into the water-immiscible organic-solvent phase, and recovering tertiary-butyl hydroperoxide from said organic phase.

12. A process for the production of a tertiary-alkyl hydroperoxide, which process comprises reacting upon hydrogen peroxide with an alkylating agent therefor in an aqueous solution in the presence of an acidic catalyst and maintaining the aqueous reaction mixture during the reaction in intimate contact with a sufficient amount of an inert water-immiscible organic solvent to provide a liquid organic-solvent phase immiscible with the aqueous reaction mixture, whereby the tertiary-alkyl hydroperoxide is extracted, substantially as rapidly as it is formed, from the aqueous reaction mixture into the water-immiscible organic-solvent phase.

13. A process according to claim 12 when the inert water-immiscible organic solvent is a lower aliphatic halogen-substituted hydrocarbon.

14. A process according to claim 13 when the lower aliphatic halogen-substituted hydrocarbon is chloroform.

15. A process according to claim 12 when the tertiary-alkyl hydroperoxide produced is tertiary-butyl hydroperoxide.

EDWARD R. BELL.
FREDERICK F. RUST.
WILLIAM E. VAUGHAN.

REFERENCES CITED

The following references are of record in the file of this patent:

UNITED STATES PATENTS

| Number | Name | Date |
|---|---|---|
| 2,092,322 | Moser | Sept. 7, 1937 |
| 2,176,407 | Milas | Oct. 17, 1939 |